United States Patent [19]

Noguchi et al.

[11] 4,119,875
[45] Oct. 10, 1978

[54] DIRECT CURRENT ELECTRIC MOTOR

[75] Inventors: Ichiro Noguchi; Chiaki Hayashi; Hisashi Muroga, all of Tokyo, Japan

[73] Assignee: Gakken Co., Ltd. Kabushiki Kaisha Gakushu Kenkyusha, Tokyo, Japan

[21] Appl. No.: 694,737

[22] Filed: Jun. 10, 1976

[30] Foreign Application Priority Data

Jun. 13, 1975 [JP] Japan .................... 50-70955

[51] Int. Cl.² ........................................ H02K 13/00
[52] U.S. Cl. .................................. 310/248; 310/71; 310/228; 310/237; 310/242
[58] Field of Search ............... 310/239, 237, 229, 230, 310/242, 244, 245, 246, 232, 241, 247, 40 MM, 248, 46, 249, 1, 228, 89, 91, 71, 264, 216, 217

[56] References Cited

U.S. PATENT DOCUMENTS

| | | | |
|---|---|---|---|
| 2,818,518 | 12/1957 | Phaneuf | 310/237 |
| 3,313,968 | 4/1967 | Kaiser | 310/89 |
| 3,486,056 | 12/1969 | Vuillemot | 310/228 |
| 3,514,654 | 5/1970 | Moresi | 310/237 |
| 3,824,416 | 7/1974 | van de Griend | 310/242 |
| 4,037,125 | 7/1977 | Aoki | 310/248 |

FOREIGN PATENT DOCUMENTS

| | | | |
|---|---|---|---|
| 1,613,078 | 1/1971 | Fed. Rep. of Germany | 310/237 |
| 2,037,993 | 5/1971 | Fed. Rep. of Germany | 310/89 |
| 2,124,929 | 11/1972 | Fed. Rep. of Germany | 310/89 |
| 1,111,527 | 5/1968 | United Kingdom | 310/237 |

*Primary Examiner*—R. Skudy
*Attorney, Agent, or Firm*—Irving M. Weiner

[57] ABSTRACT

In a permanent magnet motor wherein commutator segments have surfaces arranged in a plane perpendicular to the motor shaft for sliding contact with brushes, each brush is made of sheet metal and comprises an inner portion affixed to an end cap of the motor casing, and a substantially annular outer portion united at one of its ends to the inner portion and having an embossed contact on the other end which is resiliently urged into sliding contact with the commutator segment surfaces. The outer brush portion is notched to engage a protuberance on the end cap. A lubricant reservoir is formed either on the commutator or on each brush. The end cap may be locked in position on the motor casing, and the commutator may be mounted on the motor shaft in a predetermined angular position in relation to that of an armature core.

17 Claims, 25 Drawing Figures

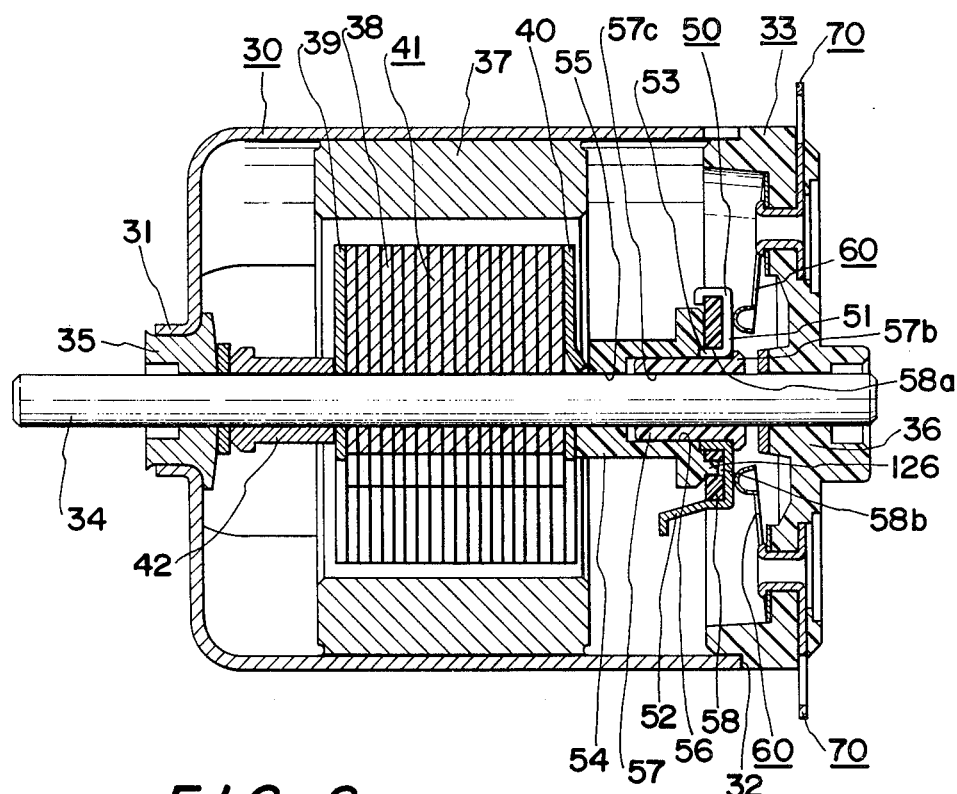
FIG. 1
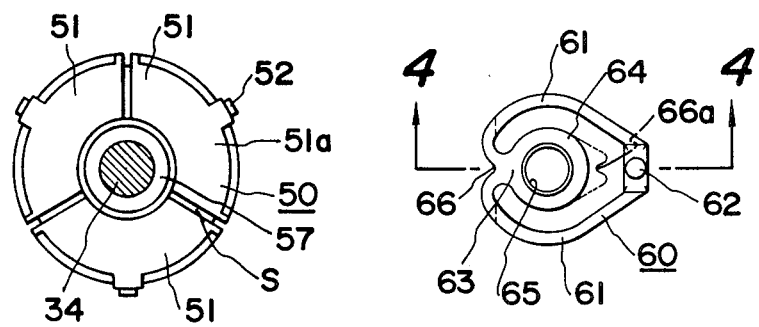
FIG. 2
FIG. 3

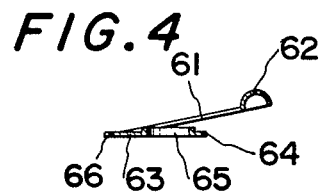
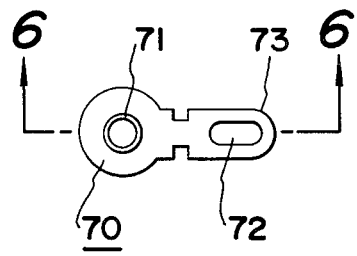
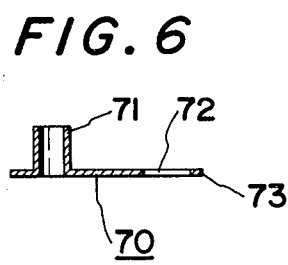
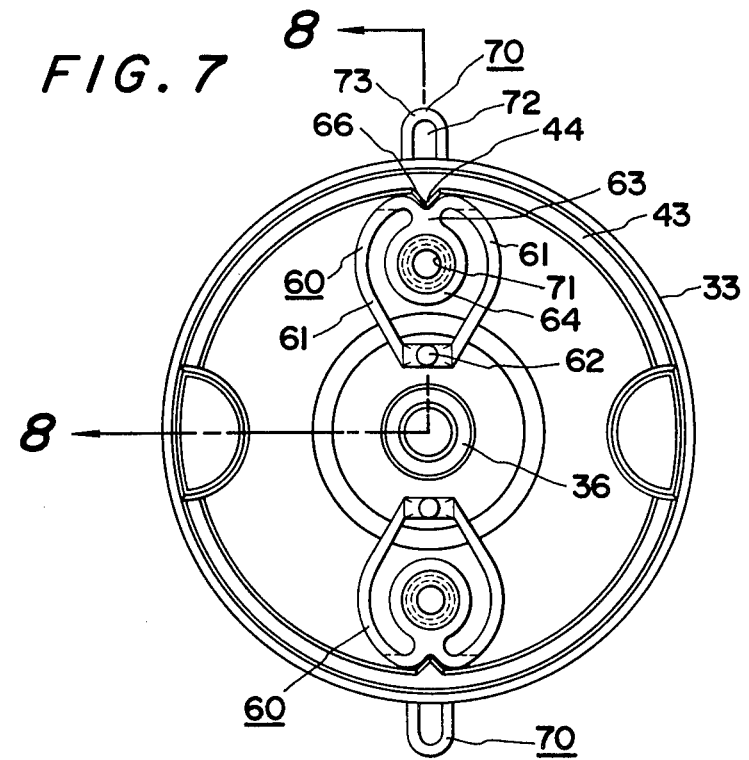

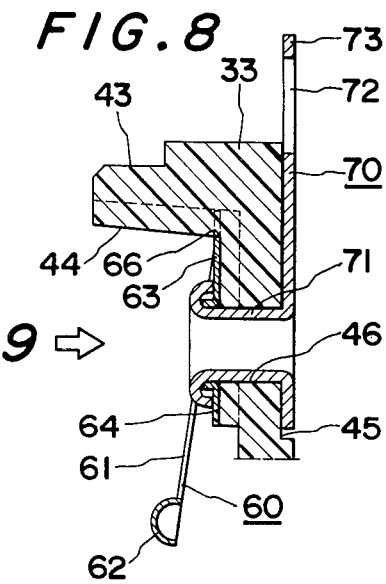
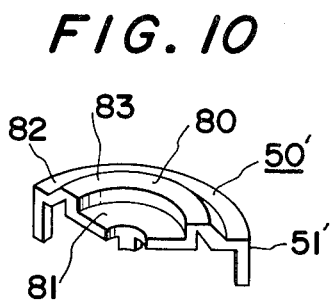
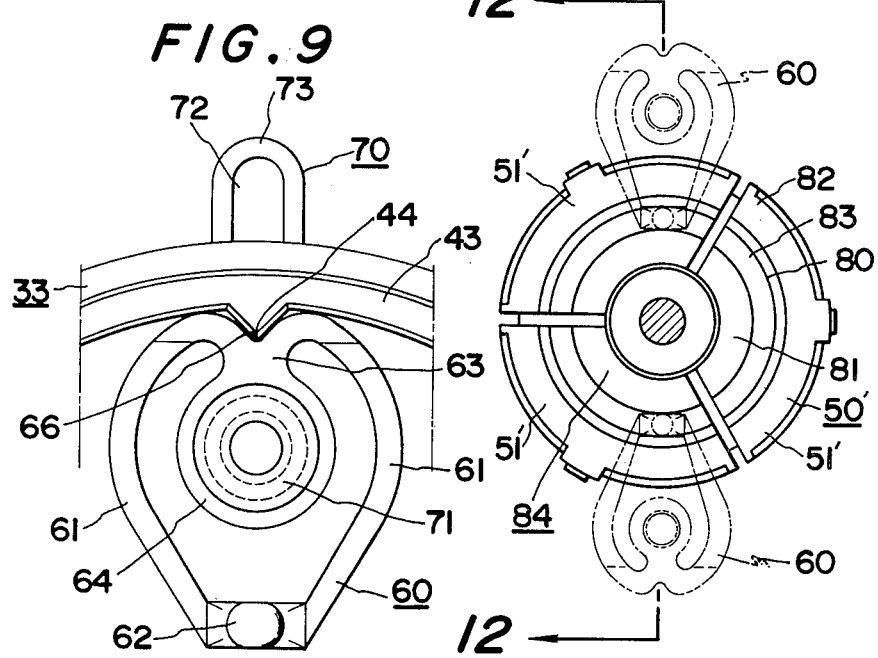

DIRECT CURRENT ELECTRIC MOTOR

BACKGROUND OF THE INVENTION

1. Field of the Invention

This invention relates to electric motors, and in particular to direct current motors of the class suitable for use in toys, portable home appliances and the like. The invention is even more particularly directed to improvements in such a direct current motor of the type wherein each commutator segment has a surface arranged at right angles to the motor shaft for sliding contact with brushes.

2. Description of the Prior Art

In a commutator motor of the above specified type, the brushes are usually riveted onto an end cap of a cylindrical motor casing or frame, in such a way that the contact portions of the brushes are resiliently urged against the commutator segment surfaces disposed opposite to the end cap. The motor of this type is easier to assemble, and the brush contact portions can be urged under constant pressure against the commutator.

If, however, each brush of such a commutator motor is fastened onto the casing end cap by a single rivet only, the brush is easily loosened by motor vibrations or suffers angular displacement due to the rotation of the commutator in sliding contact therewith. The loosened or displaced brushes will not make proper contact with the commutator and will thus shorten the life of the motor.

The fastening of each brush with two or more rivets is also undesirable because it necessitates extra time and labor for assembling. Moreover, the brush, which is extremely small in size, will suffer a decrease in strength if two or more rivet holes are formed therein.

It is another problem with the prior art commutator motor of the type under consideration that the contacting surfaces of the commutator and brushes are often not maintained in a proper state of lubrication. Since the commutator surfaces for sliding contact with the brushes are flat and are arranged at right angles to the motor shaft, the grease or the like applied on these surfaces tends to dissipate readily because of the centrifugal force produced by the rotation of the commutator. When not properly lubricated, the brushes made of phosphor bronze, brass or like material are particularly easy to wear out before the expected lifetime of the motor.

A further problem to be considered with the prior art commutator motor of the type in question concerns the installation of the commutator on the motor shaft in a predetermined angular position relative to the armature. Heretofore, for this purpose, one of the two disc-like insulators on opposite ends of the armature core has been formed to include a positioning boss or like projection which is to be received in a hole in the commutator or in some other member arranged intermediate the armature and the commutator. Such a positioning boss, however, is susceptible to breakage during assembling or handling, because the armature insulators are usually made of paperboard or similar material.

SUMMARY OF THE INVENTION

It is the primary object of this invention to provide improvements in a commutator motor of the kind specified whereby the above noted and other problems of the prior art are thoroughly overcome.

Another object of the invention is to provide, in a commutator motor of the kind specified, an improved brush construction such that each brush can be readily mounted in position on the motor and maintained in proper sliding contact with the commutator, practically without any possibility of displacement.

A further object of the invention is to provide, in a commutator motor of the kind specified, means for maintaining the contacting surfaces of commutator and brushes properly lubricated over an extended length of time.

A further object of the invention is to provide an electric motor having a casing or frame with a cap on one of its ends, which are so constructed in relation to each other that the end cap can be positively locked in position on the casing against detachment therefrom.

A further object of the invention is to provide, in a commutator motor of the kind specified, improved means for mounting the commutator on the motor shaft in a predetermined angular position in relation to that of the armature.

It is also an object of this invention to provide a commutator motor of the kind specified which can be assembled through a materially simplified procedure.

In accordance with this invention, summarized in its simplest form, there is provided that improvement in a commutator motor of the kind defined which comprises a plurality of brushes mounted on an end cap of a motor casing so as to ride on commutator segment surfaces arranged in a plane normal to a motor shaft. Integrally made of sheet metal, each brush comprises a first portion affixed at one point thereon to the end cap, a second portion connected at one end to the first portion and generally extending radially of the end cap, and a contact formed on another end of the second portion. The second portion is so angled with respect to the first portion that the contact is resiliently urged into sliding contact with the commutator segment surfaces. The improvement further comprises means on the end cap for engaging each brush so as to lock same against angular displacement.

In a preferred embodiment of the invention the first portion of each brush is affixed to the end cap by means of a cylindrical connector formed integral with a supply terminal. The connector is passed through aligned holes in the first brush portion and in the end cap and is clinched, thereby mechanically securing the former to the latter and also electrically connecting the brush to the supply terminal.

According to another feature of the invention, the contact on each brush is formed by embossing the sheet metal of which the brush is made. A cavity thus formed on the back of the brush contact is adapted to serve as a lubricant reservoir which is intended to be filled with a supply of grease or the like for lubricating the contacting surfaces of the brush and the commutator. Alternatively, such a lubricant reservoir can be formed on parts of the aforesaid commutator segment surfaces.

As an additional feature of the invention, for mounting the commutator on the motor shaft in a predetermined angular position relative to the armature, one of a pair of armature insulators is provided with a positioning tongue which has been formed therein by cutting therein a pair of parallel spaced slits extending radially outwardly from its center shaft hole. The positioning tongue is adapted to be at least partly raised or turned out of the plane of the armature insulator as the motor shaft is inserted into and through its shaft hole during assembling of the motor. The tongue of this construction is significantly stronger than the conventional positioning boss on the armature insulator mentioned previously.

The above and other objects, features, and advantages of this invention will become more clearly apparent as the description proceeds, with reference had to the accompanying drawings showing preferred embodiments of the invention.

BRIEF DESCRIPTION OF THE DRAWINGS

FIG. 1 is an axial sectional view of the commutator motor incorporating the novel concepts of this invention;

FIG. 2 is a front elevational view of a commutator used in the motor of FIG. 1, as seen from the right-hand side in FIG. 1;

FIG. 3 is a front elevational view of one of brushes in the motor of FIG. 1;

FIG. 4 is a sectional view taken along the line 4—4 of FIG. 3;

FIG. 5 is a front elevational view of one of the terminal members in the motor of FIG. 1;

FIG. 6 is a sectional view taken along the line 6—6 of FIG. 5;

FIG. 7 is an elevational view of an end cap in the motor of FIG. 1, as seen from within its casing, together with the pair of brushes mounted in position thereon;

FIG. 8 is an enlarged sectional detail view taken along the line 8—8 of FIG. 7;

FIG. 9 is an enlarged detail view of part of FIG. 7, as seen in the direction of the arrow 9 of FIG. 8;

FIG. 10 is a perspective view of one of the segments of a commutator having a lubricant reservoir in accordance with this invention;

FIG. 11 is a front elevational view of the commutator comprising the segments of FIG. 10, the commutator being shown as incorporated in the motor of FIG. 1;

DESCRIPTION OF THE PREFERRED EMBODIMENTS

Figure 12:
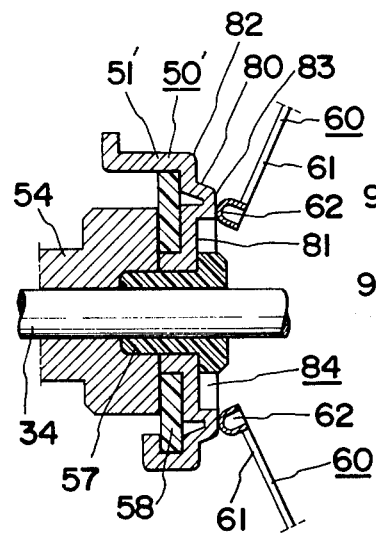
FIG. 12 is a sectional view taken along the line 12—12 of FIG. 11, the view showing the commutator of FIG. 11 together with some associated parts of the motor of FIG. 1.

With reference to FIG. 1 the commutator motor incorporating the principles of this invention broadly comprises a cylindrical casing or frame 30 having a rotatable shaft 34 extending axxially therethrough, a permanent magnet 37 fastened to the inside of the motor casing to create a constant magnetic field, an armature 41 fixedly mounted on the shaft and disposed in the field of the permanent magnet, a commutator 50 also fixedly mounted on the shaft and electrically connected to armature coils, not shown, and a pair of brushes 60 riding on the commutator for electrically connecting the armature coils to a power supply so as to permit reversal of the current in the armature coils.

The motor casing 30 is open at its right-hand end 32, which is closed by a cap 33 of electrical insulating material such as rigid plastics. The closed left-hand end of the casing 30 has a hole 31 formed centrally therein to accommodate an oilless metal bearing 35. The end cap 33 is formed to include a bearing 36 located centrally therein, and the shaft 34 is rotatably supported by these bearings 35 and 36. The left hand end of the shaft 34, projecting out of the bearing 35, is intended to provide means for imparting motor rotation to a desired external mechanism to be driven by the motor.

The armature 41 comprises a core 38 of thin sheet-steel members stacked together in the axial direction of the shaft 34, a pair of insulators 39 and 40 between which the armature core is sandwiched, and the unshown coils, as will be later described in more detail in connection with FIG. 19. A spacer 42 is mounted on the shaft 34 between the armature 41 and the bearing 35.

As will be seen also from FIG. 2, the commutator 50 arranged between the armature 41 and the casing end cap 33 comprises a plurality of, three in the illustrated embodiment, segments 51 of copper or like electrical conducting material electrically insulted from each other and from the shaft 34. Arranged radially about the shaft 34, these commutator segments have substantially sectorial surfaces 51a which are arranged in a plane normal to the axis of the shaft 34 and opposite to the casing end cap 33 for sliding contact with the pair of brushes 60. Radial gaps S exist between the commutator segments. Tongues 52 project radially from the respective commutator segments 51 for electrical connection to the unshown armature coils. The commutator segment arrangement as shown in FIG. 2 has been known and does not, by itself, constitute a feature of this invention.

The commutator segments 51 have their inside ends bent right angularly at 53 to engage a disc-like commutator insulator 58 of paperboard or plastics. The commutator segments with their insulator 58 are mounted on a flanged commutator core 57 of electrical insulating material such as plastics fixedly mounted on the shaft 34. Arranged between the armature 41 and the commutator 50 is a flanged sleeve 54, also of electrical insulating material such as plastics, having a small diameter hole 55 and a large diameter hole 56 formed therethrough in axial alignment. The small diameter hole 55 recieves the shaft 34 as with a press fit, whereas the large diameter hole 56 receives the commutator core 57, also as with a press fit. The commutator segments 51 with the insulator 58 are caught between the flanges of the sleeve 54 and the commutator core 57.

The manner of assembling of the armature 41 and the commutator 50 with the shaft 34 is later described in greater detail with reference to FIG. 24.

The pair of brushes 60 are mounted on the casing end cap 33 in diametrically opposed positions. Each brush 60 has an embossed contact 62 adapted to ride on the surfaces 51a of the commutator segments 51.

As shown in greater detail in FIGS. 3 and 4, each brush 60 is formed by punching a sheet of phosphor bronze or like electrical conducting material into the illustrated shape. More specifically, each brush 60 comprises a substantially annular or heart-shaped outer portion 61 generally extending radially of the casing end cap 33 and carrying the embossed contact 62 on one of its ends, and a circular inner portin 64 having a mounting hole 65 therethrough and united at 63 to the other end of the outer portion. The outer portion 61 completely surrounds the inner portion 64 and is spaced therefrom except the connecting portion 63.

The outer portion 61 of each brush 60 has a notch 66 at its end remote from the contact 62. The apex or pointed end of this notch 66 and the centers of the mounting hole 65 and the contact 62 are aligned in the radial direction of the casing end cap 33. It will be observed from FIG. 4 that the outer portion 61 is disposed at an angle to the inner portion 64 so that the contact 62 on the outer portion may be resiliently urged against the surfaces 51a of the commutator segments 51.

FIGS. 5 and 6 illustrate the detailed configuration of a terminal member 70 mounted on the casing end cap 33 and connected to each brush 60. Integrally molded of electrical conducting material, the terminal member 70 includes an upstanding connector 71 in the shape of a hollow cylinder located adjacent one of its ends and adapted to be relatively neatly inserted into and through a hole in the casing end cap 33. The other end of the terminal member 70 is slotted at 72 to provide a supply terminal 73.

As will be seen from FIGS. 7 through 9, the casing end cap 33 is integrally provided with an annular rim 43 which fits in the open end 32 of the casing 30. The rim 43 has a pair of V-shaped protuberances 44 formed in diameterically opposed positions thereon with their pointed ends directed toward the center of the cap. The casing end cap 33 has formed therein a pair of holes 46 which are located radially inwardly of the respective proturberances 44 on the rim 43 for receiving the connectors 71 of the terminal members 70. A pair of radial grooves 45 are formed in the outside surface of the casing end cap 33 for receiving all but the connectors 71 of the terminal members 70.

Thus, for mounting the pair of brushes 60 together with the pair of terminal members 70 in position on the casing end cap 33, the cylindrical connectors 71 of the terminal members are inserted into and through the respective holes 46 from without the cap, and the flat portions of these terminal members are fitted in the grooves 45. The connectors 71 project inwardly of the casing end cap 33, and the brushes 60 are mounted on the projecting ends of the connectors by receiving them in the mounting holes 65 in their inner portons 64. In thus mounting the brushes 60, the notches 66 in their outer portions 61 are fitted over the protuberances 44 on the rim 43 of the casing end cap 33 so that the brushes may be locked against any possibility of angular displacement about the connectors 71 in spite of the rotation of the commutator 50 in sliding contact therewith.

With the contacts 62 of the brushes 60 thus disposed in exactly diametrically opposite positions on the casing end cap 33, a compressive force may be exerted axially on the connector 71 of each terminal member 70 by means of a suitable tool so as to clinch its projecting end as best shown in FIG. 8. The brushes 60 are now mounted in position on the casing end cap 33 and are also electrically connected to the respective supply terminals 73.

As mentioned previously, the outer portion 61 of each brush 60 is angled away from the inner portion 64, so that with the brushes mounted on the casing end cap 33 in the above described manner, the embossed contacts 62 on the outer brush portions can be resiliently urged against the surfaces 51a of the commutator segments 51. Thus, as the pair of supply terminals 73 are connected to, for example, a dry cell or cells via leads, not shown, an electrical connection can be established between the unshown armature coils and the direct current power supply via the commutator 50 and the brushes 60.

The operating principles of the direct current commutator motor of FIG. 1 are believed to be well known, so that the description of such operating principles will be omitted.

The brushes 60 according to this invention being constructed and mounted in position as hereinbefore described, the "effective length" of each brush (by which is meant the brush length contributing to resiliently supporting the contact 62) is maximized with respect to the physical length of the brush in the radial direction of the casing end cap 33. The contacts 62 of these brushes will therefore remain positively urged against the commutator segment surfaces 51a throughout the lifetime of the motor.

Although each brush 60 according to the invention is affixed to the casing end cap 33 only at its inner portion 64 by the connector 71, the brush can be positively restrained from angular displacement by the V-shaped protuberance 44 fitting in the notch 66 in its outer portion 61 in spite of the rotation of the commutator 50 is sliding contact therewith. Furthermore, with the brushes 60 thus mounted in position by the connectors 71 formed integral with the supply terminals 73, no additional means are necessary for the desired electrical connection therebetween.

It should also be noted that each brush 60 is not secured to the casing end cap 33 at its connecting portion 63 bridging the outer and inner portions 61 and 64. This helps to hold the contact 62 resiliently supported in spite of the possible axial displacement of the commutator toward the brushes.

While in the illustrated embodiment the notch 66 is formed at the end of the outer portion 61 of each brush away from the contact 62, it is possible to form such a notch in the inner portion 64. For example, as indicated by the dot-and-dash lines in FIG. 3, the inner portion 64 of each brush may be slightly extended toward the contact 62 and may be notched at 66a. In this case the protuberances 44 on the rim 43 of the casing end cap are of course unnecessary, and instead a similar pair of protuberances are formed on the inside surfaces of the cap so as to fit in the respective notches 66a when the brushes are mounted in position thereon.

FIGS. 10 through 12 illustrate a commutator 50' in accordance with this invention, for use in the motor of FIG. 1, that has formed thereon a lubricant reservoir whereby the commutator is rendered self-lubricating. Like the commutator 50 of FIG. 2, the commutator 50' comprises three segments 51', and each commutator segment has an arcuate ridge 80 formed on its surface opposite to the brushes 60. The arcuate ridges 80 on the three commutator segments extend along the perimeter of the commutator so as to represent in combination a discontinuous ring bounding surface portion 81 of the commutator segments to provide the lubricant reservoir 84.

Each arcuate ridge 80 has a flat top 83 of sufficient width to remain in sliding contact with the contacts 62 of the brushes 60 during rotation of the commutator. In this particular embodiment each commutator segment 51' is shown to have a surface portion 82, on the outside of the arcuate ridge 80, that is flush with the surface portion 81. If desired, however, this surface portion 82 may also be raised and disposed flush with the top 83 of the ridge 80.

In the use of the commutator 50' in the motor of FIG. 1, a suitably thick lubricant such as the usual grease may be filled in its lubricant reservoir 84. The arcuate ridges 80 bounding the lubricant reservoir prevent the lubricant from ready dissipation due to the centrifugal force exerted thereon during commutator rotation. The lubricant will nevertheless gradually flow out onto the tops 83 of the arcuate ridges 80 to minimize the wear of the commutator segments 51' and of the brush contacts 62, thereby helping to extend the service life of the motor.

Figure 14:
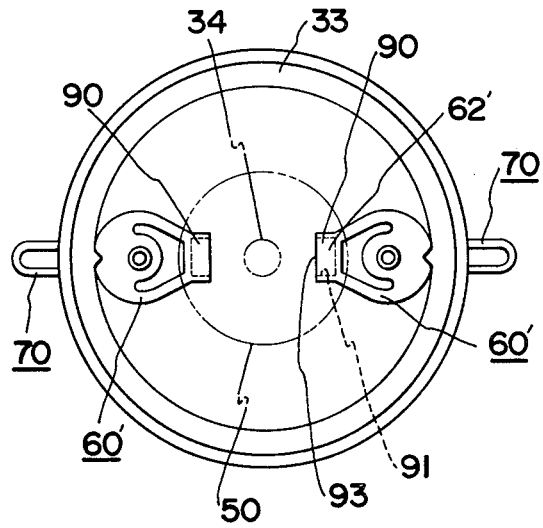
FIG. 14 is a front elevational view of a pair of brushes each having a lubricant reservoir in accordance with the invention, the brushes being shown as mounted on the end cap for use in the motor of FIG. 1.

FIG. 14 illustrates another embodiment wherein the lubricant reservoir is formed on each brush, instead of being formed on the commutator as in the preceding embodiment. Each of the pair of brushes 60' shown in FIG. 14 has a relatively large contact 62' formed thereon by embossing, in such a manner that each brush contact has a relatively large and deep cavity 91 on its back which is to serve as the desired lubricant reservoir 92.

The pair of brushes 60' having the lubricant reservoirs 92 are mounted on the casing end cap 33, in the manner previously described in connection with FIGS. 7 through 9, so as to extend horizontally when the motor is installed in a prescribed upright disposition. The lubricant reservoirs 92 have open or recessed ends 93 arranged opposite to each other.

In the use of these brushes 60', grease or the like is filled in their lubricant reservoirs 92. As heat is created frictionally in the brushes 60' by the commutator 50 rotating in sliding contact therewith, the grease in the reservoirs 92 will decrease in viscosity and flow out of the open or recessed ends 93 onto the surfaces of the contacts 62' to lubricate same. The provision of the lubricant reservoirs 92 to the brushes is advantageous in that the lubricant filled therein is not subject to any centrifugal force tending to dissipate same, so that the contacting surfaces of the commutator and brushes will be maintained lubricated for an extended length of time.

Figure 15:
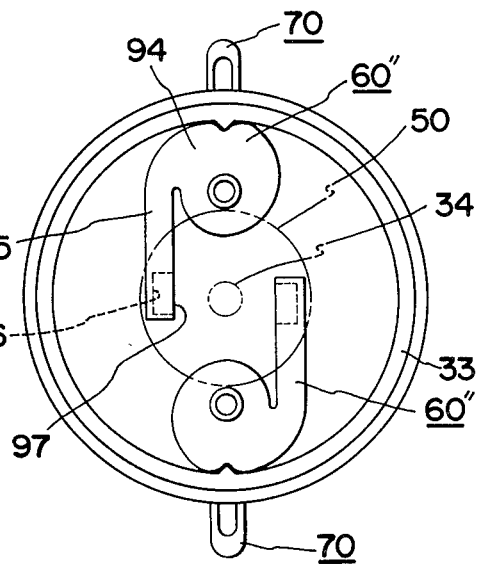
FIG. 15 is a view similar to FIG. 14 but showing a modified form of the brushes.
Figure 13:
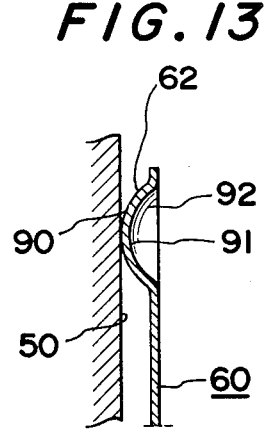
FIG. 13 is a sectional view of a brush for use in the motor of FIG. 1.

FIG. 15 is intended to manifest the fact that the principles of the FIG. 14 embodiment are applicable to other types of brushes as well. A pair of brushes 60" shown in FIG. 15, affixed to the casing end cap 33 in vertically spaced positions thereon, have elongated arms 95 extending toward each other and lying on opposite sides of the motor shaft 34. Each brush arm 95 is embossed at 96 to provide a contact facing the commutator 50 and a lubricant reservoir 97 on the back of the contact. As in the FIG. 14 embodiment each lubricant reservoir 97 has an open or recessed end disposed opposite to the motor shaft 34. As grease or the like is filled in the reservoirs 97, therefore, the contacting surfaces of commutator and brushes can be lubricated as set forth above in connection with FIG. 14.

Figure 16:
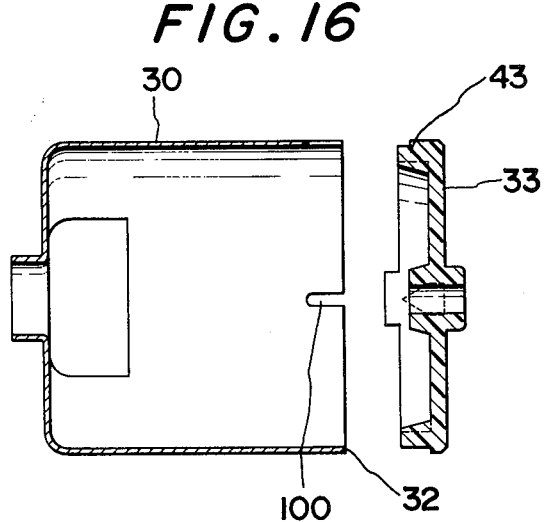
FIG. 16 is an axial sectional view showing a motor casing or frame and its end cap to illustrate means employed by this invention for securing the latter to the former.
Figure 17:
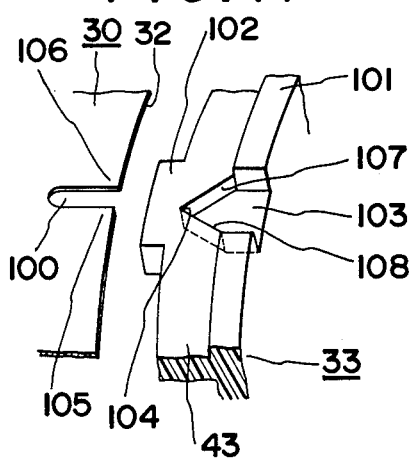
FIG. 17 is an enlarged, fragmentary perspective view showing the motor casing and end cap of FIG. 16 before the latter is mounted on the former.
Figure 18:
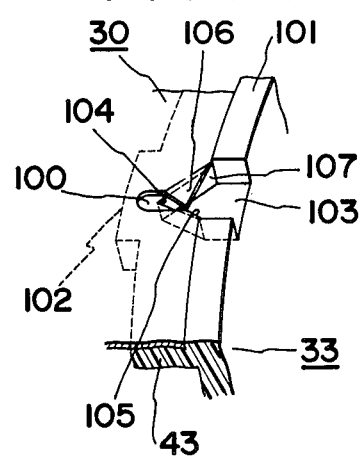
FIG. 18 is a view similar to FIG. 17 but showing the end cap mounted in position on the motor casing and locked against detachment therefrom.

FIGS. 16 through 18 illustrate the way the end cap 33 is installed on the open end 32 of the motor casing 30 and prevented from detachment therefrom in accordance with this invention. The casing 30 has a pair of diametrically opposed slots 100 formed in its open end 32, each slot extending from the open end of the casing in its axial direction to a relatively short extent.

As best shown in FIGS. 17 and 18, the end cap 33 is rimmed at 43, as mentioned previously with reference to FIGS. 7 through 9, and is further flanged at 101, with the flange projecting outwardly beyond the rim. The rim 43 has a pair of tongues 102 formed in diametrically opposed positions thereon so as to project in the direction away from the flange 101. The rim 43 and flange 101 are further formed with a pair of V-shaped notches 103 in register with the respective tongues 102. These notches have their pointed ends 104 directed toward the respective tongues 102.

For installation of the cap 33 on the open end 32 of the motor casing 30, the rim 43 of the end cap is inserted into the casing until its end 32 abuts against the flange 101 of the cap. The cap may then be manually turned relative to the casing so that the notches 103 in the former may be brought into register with the respective slots 100 in the latter. A pair of corners 105 and 106 on opposite sides of each slot 100 are then folded or bend down into the corresponding notch 103 so as to engage the respective divergent surfaces 107 and 108 defining the notch. The cap 33 is now locked in the open end of the motor casing against any possibility of accidental detachment.

In a motor of this class it has been customary to lock the end cap against detachment from the motor casing by means of a pair of relatively narrow tongues on the casing which are clinched so as to engage in respective recesses of the cap. The pairs of folded corners 105 and 106 in accordance with this invention are capable of locking the end cap far more positively than such prior art means, with each pair of folded corners functioning substantially as a wedge for tightening the cap. Of course, the folded corners themselves are significantly greater in strength than their conventional counterparts, namely, the narrow tongues. It should also be appreciated that these improved results are realized merely by forming the slots 100 in the motor casing 30 and the notches 103 in the end cap 33, and that the end cap can be locked in position simply by bending down the corners 105 and 106 of the casing into the notches.

Figure 19:
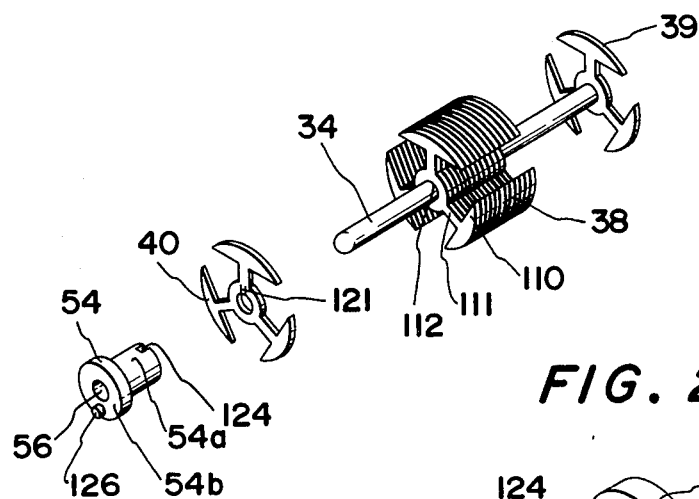
FIG. 19 is an exploded perspective view of an armature core and a flanged sleeve mounted on the shaft of the motor of FIG. 1, the view being explanatory of means employed by this invention for mounting the commutator on the motor shaft in a predetermined angular position relative to the armature core.

FIGS. 19 through 23 are directed to means employed by this invention for mounting the commutator 50 on the motor shaft 34 in a predetermined angular position with respect to that of the armature core 38. As seen in FIG. 19, the armature core 38 is a lamination of this sheet steel members 110 which have been punched into the illustrated shape, each having a plurality of, three in the illustrated embodiment, radial arms 111 with constant angular spacings therebetween and a shaft hole 112 located centrally therein. The motor shaft 34 is snugly fitted in the shaft holes 112 of the armature core members 110, which are all in angular alignment on the shaft. The armature core 38 of course carries the unshown coils electrically connected to the commutator segments.

Also mounted on the motor shaft 34 are the pair of armature insulators 39 and 40 of paperboard or the like which are located on opposite ends of the armature core 38 and which are identical in shape with each of the core members 110. The armature insulator 40, however, which is located opposite to the sleeve 54, is made slightly different in construction from the other armature insulator 39.

Figure 20:
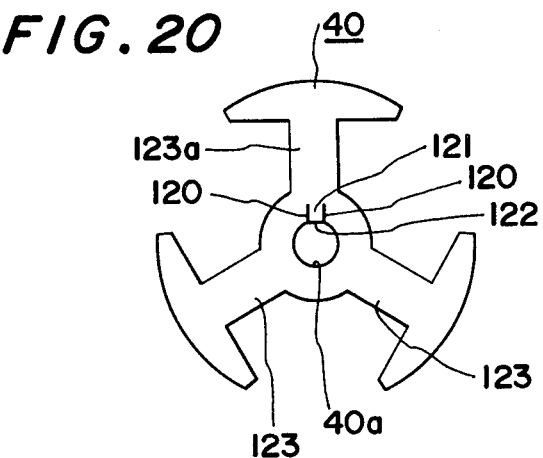
FIG. 20 is an enlarged front elevational view of one of a pair of armature insulators of FIG. 19 which has a positioning tongue.

As shown in greater detail in FIG. 20, the armature insulator 40 has a pair of parallel spaced slits or cuts 120 and 121 of relatively short extent extending radially outwardly from a centrally located shaft hole 40a of the armature insulator to provide a tongue 121. This tongue has a free or inside end 122 which may be straight edged or, alternatively, may slightly project into the shaft hole 40a. Preferably, the tongue 121 should be radially aligned with one (123a) of the three arms 123 of the armature insulator so that same may not suffer a decrease in strength by the slitting. If desired, the tongue 121 may be creased, prior to assembling, at its end opposite to the said end 122 so that the tongue may be readily raised or bent along the crease during assembling, as will be more fully described later in connection with FIGS. 22 and 23.

Figure 21:
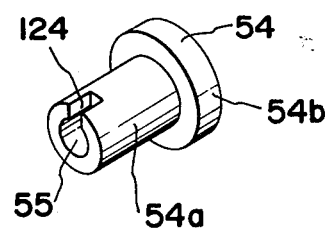
FIG. 21 is an enlarged perspective view of the flanged sleeve of FIG. 19.

With reference to FIG. 21 the sleeve 54 mounted on the motor shaft 34 between the armature 41 and the commutator 50 comprises a cylindrical portion 54a and a flange 54b on one end of the cylindrical portion. The sleeve 54 has a positioning recess 124 formed in the other end of its cylindrical portion 54a and a positioning boss 126, FIG. 19, projecting from its flange 54b.

Figure 22:
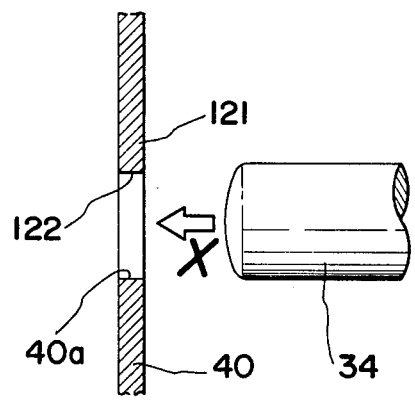
FIG. 22 is an enlarged, fragmentary vertical axial sectional view of the armature insulator of FIG. 20 as shown in a condition before insertion of the motor shaft into its hole.

In assembling the motor shaft 34 may be inserted into and through the hole 40a in the armature insulator 40 as indicated by the arrow X in FIG. 22. Since the armature insulator tongue 121 more or less projects into the shaft hole 40a as aforesaid, this tongue will then be at least partly raised by the motor shaft out of the plane of the armature insulator 40, as indicated by the numeral 125 in FIG. 23. It will be observed from FIG. 23 that the tongue 121 is curved, rather than being sharply bent, so as not to cause any cracks or fissures in the fibrous structure of which the armature insulator is made. The projecting tongue 121 is directed toward the sleeve 54 which is to be mounted subsequently on the motor shaft 34.

Figure 23:
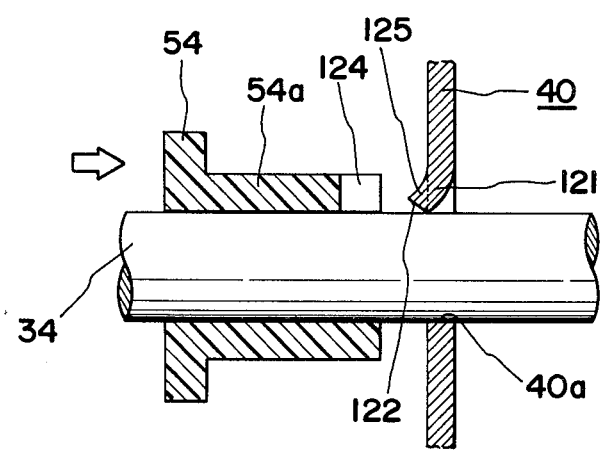
FIG. 23 is a view similar to FIG. 22 but showing the motor shaft inserted into and through the hole in the armature insulator to raise the positioning tongue to its working position, the view also showing the flanged sleeve of FIG. 21 mounted subsequently on the motor shaft.

As shown in FIG. 23, the sleeve 54 is then mounted on the motor shaft 34, and the projecting tongue 121 of the armature insulator 40 is engaged in the recess 124 of the sleeve. This sleeve is now disposed in a predetermined angular position on the motor shaft in relation to that of the armature insulator 40 and therefore of the armature core 38. The positioning boss 126 projecting from the flange 54b on the sleeve 54 may be inserted into a positioning hole 58b, FIGS. 1 and 25, formed eccentrically in the insulator 58 of the commutator 50 mounted subsequently on the motor shaft 34, thereby retaining the commutator in a predetermined angular position with respect to that of the armature core 38, as will be more fully understood from the following description of FIG. 24.

Figure 24:
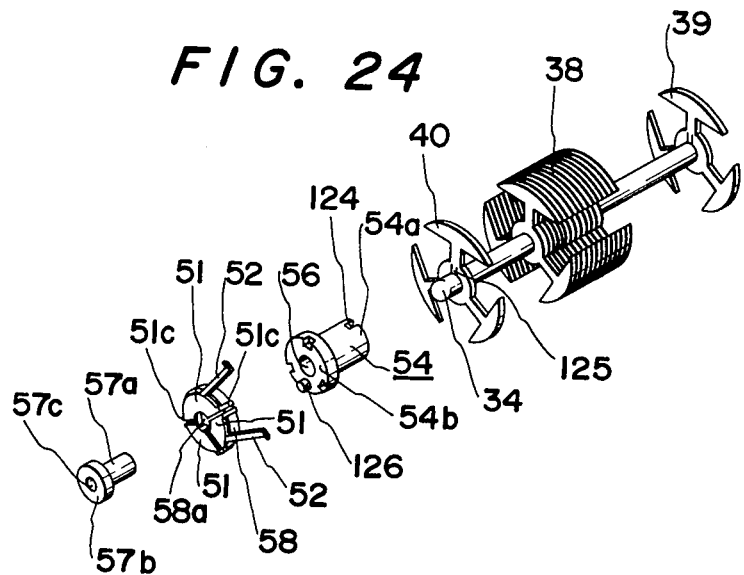
FIG. 24 is an exploded perspective view explanatory of the way the armature core and the commutator are assembled and mounted on the motor shaft in their predetermined relative angular positions.

FIG. 24 is explanatory of the way the armature 41 and the commutator 50 are assembled with the shaft 34 in their predetermined relative angular positions thereon in the motor of FIG. 1. Upon installation of the armature core 38 with its insulators 39 and 40 on the motor shaft 34, the sleeve 54 is mounted on the shaft next to the armature insulator 40, with its flange 54b directed away therefrom, and the projecting tongue 121 of that insulator is engaged in the recess 124 of the sleeve.

Prior to installation on the motor shaft 34, the commutator 50 may be assembled as follows. The three commutator segments 51 are carried by the disc-like commutator insulator 58 having formed therein a center hole 58a which is significantly greater in diameter than the motor shaft 34, in addition to the eccentric positioning hole 58b. For affixation of the commutator segments 51 to the insulator 58, the inside ends 53 of the former are bent right angularly and inserted into the insulator center hole 58a, as mentioned previously in connection with FIG. 1. Lugs 51c projecting outwardly from the commutator segments 51 are likewise bent to engage or embrace the periphery of the insulator 58.

The commutator segment-insulator assembly thus prepared is held against the flange 54b of the sleeve 54 which has been mounted on the motor shaft 34, and the positioning boss 126 projecting from the sleeve flange 54b is fitted in the eccentric positioning hole 58b in the commutator insulator 58. With the commutator segment-insulator assembly manually held in position against the sleeve flange 54b, the commutator core 57 is then installed by tightly fitting the motor shaft 34 in its axial bore 57c. The cylindrical portion 57a of this commutator core is driven through the center hole 58a of the commutator segment-insulator assembly into the large diameter hole 56 of the sleeve 54, with the result that the assembly is caught between the flanges 54b and 57b of the sleeve 54 and the commutator core 57. The commutator 50 is now securely installed on the motor in the predetermined angular position in relation to that of the armature core 38.

It will have been noted that the commutator is assembled and installed in position on the motor shaft merely by the interfitting engagement of its various parts, without resort to brazing, soldering or other fastening means. Attention should also be directed to the positioning tongue 121 of the armature insulator 40 employed for determination of the angular position of the commutator relative to the armature core. This positioning tongue can be formed merely by cutting a pair of slits in the armature insulator, being urged to its working position of FIG. 23 as the motor shaft is inserted through the insulator during assembling of the armature. The positioning tongue according to the invention is preferable to, for example, a boss formed on the armature insulator in accordance with the prior art, because the insulator with such a tongue is easier to produce and because the tongue is less likely to be broken off during assembling or handling. Furthermore, the tongue is so located on the armature insulator that its radial arms do not suffer any substantial descrease in strength.

Figure 25:
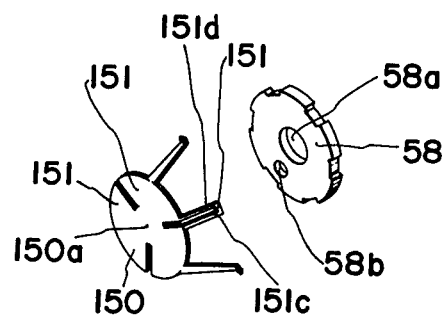
FIG. 25 is a perspective view explanatory of a method of assembling commutator segments with a commutator insulator.

FIG. 25 illustrates another method of assembling commutator segments with the insulator 58. The reference numeral 150 in FIG. 25 denotes a commutator segment blank which has been formed by punching sheet copper or the like into the illustrated shape. The commutator segment blank 150 comprises three segment portions 151 which are interconnected at a central portion 150a of the blank and at bridges 151d joining the lugs 151c projecting outwardly from the segment portions.

For assembling the commutator segment blank 150 is placed over the commutator insulator 58 of the above described construction, and the central portion 150a of the blank is punched into the center hole 58a of the insulator, thereby removing this central portion and also bending the inner ends of the segment portions 151 right-angularly for insertion into the insulator center hole. The bridge 151d joining the lugs 151c are then cut off, and these lugs are bent so as to engage the periphery of the insulator 58.

It is now clear that the motor of FIG. 1 can be assembled through a greatly simplified procedure, which can be largely automated if desired. Although the foregoing description of FIGS. 19 through 25 has been made in conjunction with the particular commutator 50 of FIGS. 1 and 2, it will be evident that the commutator 50' of FIGS. 10 through 12 can be assembled and mounted on the motor shaft in a predetermined angular position relative to the armature core in the same manner.

It is to be understood that this invention is not to be limited to the precise forms and embodiments as disclosed herein since they are intended to be illustrative of the principles of the invention. The concepts and principles of the invention may be embodied in other forms and adapted for other motors of comparable character. The invention, therefore, is to be accorded the full scope of the claims appended hereto.

What is claimed is:

1. In an electric motor of the type wherein a commutator comprising a plurality of segments is fixedly mounted on a rotatable shaft within a casing having an end cap, with the commutator segments having surfaces arranged in a plane normal to the axis of the shaft, the improvement comprising:
    (a) a plurality of brushes each integrally made of sheet metal, each said brush comprising:
        (1) a first portion affixed at one point thereon to said end cap;
        (2) a second portion connected at one end to said first portion and generally extending radially of said end cap past said first portion; and
        (3) a contact formed on another end of said second portion, said second portion being angled with respect to said first portion whereby said contact is resiliently urged into sliding contact with the surfaces of said commutator segments;
    (b) means on said end cap for engaging each said brush so as to lock same against angular displacement about said one point on said first portion thereof; and
    (c) said second portion of each said brush having a notch formed in said one end thereof for engagement by said engaging means on said end cap of said casing.

2. The electric motor as set forth in claim 1, wherein:
    said end cap of said casing is provided with an annular rim adapted to fit in an open end of said casing; and
    said engaging means comprises a V-shaped protuberance formed on said rim of said end cap for engagement in said notch in said second portion of each said brush.

3. The electric motor as set forth in claim 1, further comprising:
    (a) an armature core fixedly mounted on said shaft;
    (b) a pair of armature insulators mounted on said shaft and secured to said armature core at its opposite ends, each armatue insulator having a hole for receiving said shaft;
    (c) one of said armature insulators having a positioning tongue formed therein a pair of cut parallel spaced slits extending radially from said hole, said positioning tongue being adapted to be held at least partly raised away from said armature core by said shaft; and
    (d) a sleeve fixedly mounted on said shaft next to said one armature insulator;
    (e) there being a recess in said sleeve for receiving said positioning tongue of said one armature insulator whereby said sleeve is disposed in a predetermined angular position relative to said armature core;
    (f) said sleeve including positioning means for engaging said commutator whereby said commutator is disposed on said shaft in a predetermined angular position relative to said armature core.

4. The electric motor as set forth in claim 3, wherein said one armature insulator includes a plurality of radial arms, and wherein said positioning tongue is in alignment with one of said radial arms.

5. The electric motor as set forth in claim 3, wherein said commutator segments are carried by a disc-like commutator insulator having a center hole and an eccentric positioning hole therein, wherein said sleeve has a flange on its end away from said one armature insulator, and wherein said positioning means of said sleeve is a boss formed on said flange of said sleeve, said boss being adapted to be inserted into said positioning hole in said commutator insulator.

6. The electric motor as set forth in claim 5, including a commutator core in the form of a hollow cylinder of electrical insulating material having a flange on one end, said commutator core being fixedly mounted on said shaft and having another end tightly inserted into said sleeve through said center hole in said commutator insulator, whereby said commutator segments and said commutator insulator are caught between said flanges of said sleeve and said commutator core.

7. An electric motor in accordance with claim 1, wherein:
    said end cap is provided with a rim adapted to fit in an open end of said casing;
    said rim has formed thereon said means for engaging each said brush;
    said motor is further provided with means for locking said end cap in position at said open end of said casing, said locking means comprising:
        (a) at least a pair of notches provided on said rim of said end cap, each said notch of said rim being defined by a pair of divergent surfaces;
        (b) at least a pair of slots formed in said open end of said casing, said slots being adapted to be respectively in register with said notches of said rim; and (c) a pair of corners disposed on opposite sides of each said slot of said casing, each said corner being adapted to be bent down into one of said notches of said rim so as to engage one of the respective divergent surfaces defining same.

8. The electric motor as set forth in claim 7, wherein said end cap has a flange projecting outwardly of said rim, and wherein said notches extend into said flange.

9. In an electric motor of the type wherein a commutator comprising a plurality of segments is fixedly mounted on a rotatable shaft within a casing having an end cap, with the commutator segments having surfaces arranged in a plane normal to the axis of the shaft, the improvement comprising:

(a) a plurality of brushes each integrally made of sheet metal, each of said brushes comprising:
  (1) a first portion affixed at one point thereon to said end cap;
  (2) a second portion connected at one end to said first portion and generally extending radially of said end cap past said first portion; and
  (3) a contact formed on another end of said second portion, said second portion being angled with respect to said first portion whereby said contact is resiliently urged into sliding contact with said surfaces of said commutator segments;

(b) means on said end cap for engaging each said brush so as to lock same against angular displacement about said one point on said first portion thereof;

(c) said second portion of each said brush being substantially in the shape of a ring surrounding said first portion thereof; and (d) said second portion of each said brush having a notch formed in said one end thereof for engagement by said engaging means on said end cap of said casing.

10. In an electric motor of the type wherein a commutator comprising a plurality of segments is fixedly mounted on a rotatable shaft within a casing having an end cap, with the commutator segments having surfaces arranged in a plane normal to the axis of the shaft, the improvement comprising:

(a) a plurality of brushes each integrally made of sheet metal, each said brush comprising:
  (1) a first portion affixed at one point thereon to said end cap;
  (2) a second portion connected at one end to said first portion and generally extending radially of said end cap past said first portion; and
  (3) a contact formed on another end of said second portion, said second portion being angled with respect to said first portion whereby said contact is resiliently urged into sliding contact with said surfaces of said commutator segments;

(b) means on said end cap for engaging each said brush so as to lock same against angular displacement about said one point on said first portion thereof;

(c) a plurality of terminal members mounted on the outside of said end cap said casing;

(d) there being a plurality of holes in said end cap;

(e) there also being a hole in said first portion of each said brush; and (f) a connector in the form of a cylinder of electrical conducting material passed through said hole in said first portion of each said brush and through one of said holes in said end cap, each said connector being connected at one end to one of said terminal members and having another end clinched to secure said first portion of each said brush to said end cap.

11. The electric motor as set forth in claim 10, wherein each said connector is formed integral with one of said terminal members.

12. In an electric motor of the type wherein a commutator comprising a plurality of segments is fixedly mounted on a rotatable shaft within a casing having an end cap, with the commutator segments having surfaces arranged in a plane normal to the axis of the shaft, the improvement comprising:

(a) a plurality of brushes each integrally made of sheet metal, each said brush comprising:
  (1) a first portion affixed at one point thereon to said end cap;
  (2) a second portion connected at one end to said first portion and generally extending radially of said end cap past said first portion; and
  (3) a contact formed on another end of said second portion, said second portion being angled with respect to said first portion whereby said contact is resiliently urged into sliding contact with said surfaces of said commutator segments;

(b) means on said end cap for engaging each said brush so as to lock same against angular displacement about said one point on said first portion thereof; and (c) means for bounding a lubricant reservoir on part of said surfaces of said commutator segments, said lubricant reservoir being adapted to hold therein a lubricant for lubricating contacting surfaces of said commutator segments and said brushes.

13. The electric motor as set forth in claim 12, wherein said bounding means is an arcuate ridge formed on said surface of each said commutator segment, said arcuate ridges on said surfaces of said commutator segments being so arranged as to represent in combination a discontinuous ring.

14. The electric motor as set forth in claim 13, wherein said ridge on said surface of each said commutator segment has a flat top adapted to make sliding contact with said contacts of said brushes.

15. In an electric motor of the type wherein a commutator comprising a plurality of segments is fixedly mounted on a rotatable shaft within a casing having an end cap, with the commutator segments having surfaces arranged in a plane normal to the axis of the shaft, the improvement comprising:

(a) a plurality of brushes each integrally made of sheet metal, each said brush comprising:
  (1) a first portion affixed at one point thereon to said end cap;
  (2) a second portion connected at one end to said first portion and generally extending radially of said end cap past said first portion; and
  (3) a contact formed on another end of said second portion, said second portion being angled with respect to said first portion whereby said contact is resiliently urged into sliding contact with said surfaces of said commutator segments;

(b) means on said end cap for engaging each said brush so as to lock same against angular displacement about said one point on said first portion thereof;

(c) said contact of each said brush being formed by embossing the sheet metal so as to form a cavity on its back, said cavity being adapted to serve as a lubricant reservoir for holding a lubricant therein and thereby for lubricating said contact.

16. The electric motor as set forth in claim 15, wherein said lubricant reservoir of each said brush has an open end through which the lubricant is permitted to flow onto said contact.

17. The electric motor as set forth in claim 16, wherein said brushes are so arranged as to generally extend horizontally when the motor is installed in a prescribed upright disposition, said open ends of said lubricant reservoirs being disposed opposite to said shaft.

* * * * *